United States Patent
Hasan et al.

(10) Patent No.: US 8,685,340 B2
(45) Date of Patent: Apr. 1, 2014

(54) MICROFLUIDIC TRANSFER PIN

(75) Inventors: Leila Hasan, Brookline, MA (US); John Linton, Lincoln, MA (US); Colin J. H. Brenan, Marblehead, MA (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 12/148,416

(22) Filed: Apr. 17, 2008

(65) Prior Publication Data

US 2009/0054266 A1 Feb. 26, 2009

Related U.S. Application Data

(62) Division of application No. 10/227,179, filed on Aug. 23, 2002, now Pat. No. 8,277,753.

(51) Int. Cl.
*B01L 3/00* (2006.01)

(52) U.S. Cl.
USPC ........... 422/500; 422/501; 422/502; 422/503; 422/504; 436/180

(58) Field of Classification Search
USPC .................... 422/99–101, 500–504; 436/180
See application file for complete search history.

(56) References Cited

U.S. PATENT DOCUMENTS

| 1,236,137 | A | 8/1917 | Bastow |
| 2,745,001 | A | 5/1956 | Guth |
| 2,771,398 | A | 11/1956 | Snyder |
| 3,043,669 | A | 7/1962 | Charles |
| 3,170,980 | A | 2/1965 | Pritchard |
| 3,252,331 | A | 5/1966 | Lancaster |
| 3,768,974 | A | 10/1973 | Storm |
| 3,770,383 | A | 11/1973 | Price |
| 3,864,512 | A | 2/1975 | Meadow |
| 3,873,268 | A | 3/1975 | McKie, Jr. |
| 3,894,512 | A | 7/1975 | Ohno et al. |
| 3,997,396 | A | 12/1976 | Delente |
| 4,007,010 | A | 2/1977 | Woodbridge, III |
| 4,065,263 | A | 12/1977 | Woodbridge, III |
| 4,088,448 | A | 5/1978 | Lilja et al. |
| 4,110,165 | A | 8/1978 | Cole et al. |
| 4,111,754 | A | 9/1978 | Park |
| 4,234,316 | A | 11/1980 | Hevey |
| 4,273,877 | A | 6/1981 | Anagnostopoulos et al. |

(Continued)

FOREIGN PATENT DOCUMENTS

| DE | 10046224 | 3/2002 |
| EP | 0236069 | 9/1987 |

(Continued)

OTHER PUBLICATIONS

International Search Report for PCT/US2003/26441 (Feb. 1, 2004) (4 pages).

(Continued)

*Primary Examiner* — Jyoti Nagpaul

(57) ABSTRACT

A liquid dispenser for a microfluidic assay system is described. The dispenser includes at least one transfer pin for transferring a microfluidic sample of liquid to a target receptacle. A pin tip at one end of the transfer pin is structured to cooperate with an opening in the target receptacle. The tip uses capillary action to transfer the sample from the pin to the receptacle.

34 Claims, 2 Drawing Sheets

(56) References Cited

U.S. PATENT DOCUMENTS

| | | | |
|---|---|---|---|
| 4,415,732 A | 11/1983 | Caruthers et al. | |
| 4,446,239 A | 5/1984 | Tsuji et al. | |
| 4,453,805 A | 6/1984 | Ashkin et al. | |
| 4,458,066 A | 7/1984 | Caruthers et al. | |
| 4,493,815 A | 1/1985 | Fernwood et al. | |
| 4,500,707 A | 2/1985 | Caruthers et al. | |
| 4,562,045 A | 12/1985 | Murata et al. | |
| 4,562,871 A | 1/1986 | Astle | |
| 4,586,546 A | 5/1986 | Mezei et al. | |
| 4,613,573 A | 9/1986 | Shibayama et al. | |
| 4,626,509 A | 12/1986 | Lyman | |
| 4,659,677 A | 4/1987 | Glover et al. | |
| 4,663,163 A | 5/1987 | Hou et al. | |
| 4,678,894 A | 7/1987 | Shafer | |
| 4,682,890 A | 7/1987 | de Macario et al. | |
| 4,682,891 A | 7/1987 | de Macario et al. | |
| 4,683,195 A | 7/1987 | Mullis et al. | |
| 4,683,202 A | 7/1987 | Mullis | |
| 4,701,304 A | 10/1987 | Horn et al. | |
| 4,722,515 A | 2/1988 | Ham | |
| 4,734,192 A | 3/1988 | Champion et al. | |
| 4,761,378 A | 8/1988 | Godsey | |
| 4,828,386 A | 5/1989 | Matkovich et al. | |
| 4,834,946 A | 5/1989 | Levin | |
| 4,861,448 A | 8/1989 | Cantor et al. | |
| 4,861,722 A | 8/1989 | Sano et al. | |
| 4,869,114 A | 9/1989 | Kido et al. | |
| 4,873,633 A | 10/1989 | Mezei et al. | |
| 4,893,886 A | 1/1990 | Ashkin et al. | |
| 4,932,806 A | 6/1990 | Eklund et al. | |
| 4,965,188 A | 10/1990 | Mullis et al. | |
| 4,973,679 A | 11/1990 | Caruthers et al. | |
| 4,990,459 A | 2/1991 | Maeda et al. | |
| 5,000,921 A | 3/1991 | Hanaway et al. | |
| 5,009,846 A | 4/1991 | Gavet et al. | |
| 5,038,852 A | 8/1991 | Johnson et al. | |
| 5,041,266 A | 8/1991 | Fox | |
| 5,047,215 A | 9/1991 | Manns | |
| 5,100,627 A | 3/1992 | Buican et al. | |
| 5,108,704 A | 4/1992 | Bowers et al. | |
| 5,108,926 A | 4/1992 | Klebe | |
| 5,152,060 A | 10/1992 | Schubert et al. | |
| 5,153,319 A | 10/1992 | Caruthers et al. | |
| 5,175,209 A | 12/1992 | Beattie et al. | |
| 5,192,980 A | 3/1993 | Dixon et al. | |
| 5,204,268 A | 4/1993 | Matsumoto | |
| 5,210,021 A | 5/1993 | Goodwin, Jr. | |
| 5,215,593 A | 6/1993 | Nojo et al. | |
| 5,219,727 A | 6/1993 | Wang et al. | |
| 5,229,163 A | 7/1993 | Fox | |
| 5,234,665 A | 8/1993 | Ohta et al. | |
| 5,234,666 A | 8/1993 | Suzuki et al. | |
| 5,242,974 A | 9/1993 | Holmes | |
| 5,262,128 A | 11/1993 | Leighton et al. | |
| 5,284,753 A | 2/1994 | Goodwin, Jr. | |
| 5,290,705 A | 3/1994 | Davis | |
| 5,310,652 A | 5/1994 | Gelfand et al. | |
| 5,322,019 A | 6/1994 | Hyland | |
| 5,322,770 A | 6/1994 | Gelfand | |
| 5,333,675 A | 8/1994 | Mullis et al. | |
| 5,373,803 A | 12/1994 | Noguchi et al. | |
| 5,374,525 A | 12/1994 | Lalouel et al. | |
| 5,382,985 A | 1/1995 | Becker et al. | |
| 5,407,800 A | 4/1995 | Gelfand et al. | |
| 5,411,876 A | 5/1995 | Bloch et al. | |
| 5,427,908 A | 6/1995 | Dower et al. | |
| 5,433,975 A | 7/1995 | Roberts et al. | |
| 5,443,791 A | 8/1995 | Cathcart et al. | |
| 5,445,934 A | 8/1995 | Fodor et al. | |
| 5,453,252 A | 9/1995 | Truett | |
| 5,455,008 A | 10/1995 | Earley et al. | |
| 5,466,583 A | 11/1995 | Thomson et al. | |
| 5,475,610 A | 12/1995 | Atwood et al. | |
| 5,476,744 A | 12/1995 | Anno | |
| 5,476,774 A | 12/1995 | Wang et al. | |
| 5,491,083 A | 2/1996 | Arentzen et al. | |
| 5,492,806 A | 2/1996 | Drmanac et al. | |
| 5,504,007 A | 4/1996 | Haynes | |
| 5,506,141 A | 4/1996 | Weinreb et al. | |
| 5,508,197 A | 4/1996 | Hansen et al. | |
| 5,508,200 A | 4/1996 | Tiffany et al. | |
| 5,510,270 A | 4/1996 | Fodor et al. | |
| 5,519,218 A | 5/1996 | Chang | |
| 5,525,464 A | 6/1996 | Drmanac et al. | |
| 5,538,848 A | 7/1996 | Livak et al. | |
| 5,551,487 A * | 9/1996 | Gordon et al. | 141/1 |
| 5,554,339 A | 9/1996 | Cozzette et al. | |
| 5,560,811 A | 10/1996 | Briggs et al. | |
| 5,561,058 A | 10/1996 | Gelfand et al. | |
| 5,561,071 A | 10/1996 | Hollenberg et al. | |
| 5,576,220 A | 11/1996 | Hudson et al. | |
| 5,580,717 A | 12/1996 | Dower et al. | |
| 5,585,275 A | 12/1996 | Hudson et al. | |
| 5,593,839 A | 1/1997 | Hubbell et al. | |
| 5,599,664 A | 2/1997 | Schwartz | |
| 5,602,756 A | 2/1997 | Atwood et al. | |
| 5,605,662 A | 2/1997 | Heller et al. | |
| 5,609,828 A | 3/1997 | O'Bear et al. | |
| 5,621,094 A | 4/1997 | Roser et al. | |
| 5,632,957 A | 5/1997 | Heller et al. | |
| 5,641,391 A | 6/1997 | Hunter et al. | |
| 5,641,864 A | 6/1997 | Gelfand | |
| 5,656,493 A | 8/1997 | Mullis et al. | |
| 5,667,972 A | 9/1997 | Drmanac et al. | |
| 5,670,329 A | 9/1997 | Oberhardt | |
| 5,710,381 A | 1/1998 | Atwood et al. | |
| 5,720,923 A | 2/1998 | Haff et al. | |
| 5,722,370 A | 3/1998 | Koike et al. | |
| 5,744,101 A | 4/1998 | Fodor et al. | |
| 5,763,263 A | 6/1998 | Dehlinger | |
| 5,770,151 A * | 6/1998 | Roach et al. | 422/63 |
| 5,770,440 A | 6/1998 | Berndt | |
| 5,770,860 A | 6/1998 | Franzen | |
| 5,773,238 A | 6/1998 | Shukla | |
| 5,780,233 A | 7/1998 | Guo et al. | |
| 5,785,926 A | 7/1998 | Seubert et al. | |
| 5,786,226 A | 7/1998 | Bocker et al. | |
| 5,795,748 A | 8/1998 | Cottingham | |
| 5,807,522 A | 9/1998 | Brown et al. | |
| 5,840,862 A | 11/1998 | Bensimon et al. | |
| 5,843,767 A | 12/1998 | Beattie | |
| 5,849,598 A | 12/1998 | Wilson et al. | |
| 5,856,100 A | 1/1999 | Hayashizaki | |
| 5,869,006 A | 2/1999 | Fanning et al. | |
| 5,871,908 A | 2/1999 | Henco et al. | |
| 5,879,632 A | 3/1999 | Demers | |
| 5,880,071 A | 3/1999 | Parce et al. | |
| 5,888,723 A | 3/1999 | Sutton et al. | |
| 5,897,842 A | 4/1999 | Dunn et al. | |
| 5,906,683 A | 5/1999 | Chen et al. | |
| 5,910,287 A | 6/1999 | Cassin et al. | |
| 5,922,604 A | 7/1999 | Stapleton et al. | |
| 5,928,907 A | 7/1999 | Woudenberg et al. | |
| 5,929,208 A | 7/1999 | Heller et al. | |
| 5,942,432 A | 8/1999 | Smith et al. | |
| 5,944,652 A | 8/1999 | Miller et al. | |
| 5,955,377 A | 9/1999 | Maul et al. | |
| 5,958,345 A | 9/1999 | Turner et al. | |
| 5,962,316 A | 10/1999 | Beach et al. | |
| 5,985,214 A | 11/1999 | Stylli et al. | |
| 5,994,056 A | 11/1999 | Higuchi | |
| 6,001,586 A | 12/1999 | Schellenberger | |
| 6,004,744 A | 12/1999 | Goelet et al. | |
| 6,015,880 A | 1/2000 | Baldeschwieler et al. | |
| 6,020,141 A | 2/2000 | Pantoliano et al. | |
| 6,024,925 A | 2/2000 | Little et al. | |
| 6,027,873 A | 2/2000 | Schellenberger et al. | |
| 6,060,240 A | 5/2000 | Kamb et al. | |
| 6,071,702 A | 6/2000 | Yamamoto et al. | |
| 6,071,748 A | 6/2000 | Modlin et al. | |
| 6,083,682 A | 7/2000 | Campbell et al. | |
| 6,083,763 A | 7/2000 | Balch | |
| 6,086,825 A * | 7/2000 | Sundberg et al. | 422/507 |
| 6,088,100 A | 7/2000 | Brenan et al. | |

(56) References Cited

U.S. PATENT DOCUMENTS

| | | | |
|---|---|---|---|
| 6,090,251 A | 7/2000 | Sundberg et al. |
| 6,103,199 A | 8/2000 | Bjornson et al. |
| 6,103,479 A | 8/2000 | Taylor |
| 6,107,059 A | 8/2000 | Hart |
| 6,121,048 A | 9/2000 | Zaffaroni et al. |
| 6,132,685 A | 10/2000 | Kercso et al. |
| 6,136,566 A | 10/2000 | Sands et al. |
| 6,136,592 A | 10/2000 | Leighton |
| H001919 H | 11/2000 | Caspar et al. |
| 6,147,198 A | 11/2000 | Schwartz |
| 6,149,787 A | 11/2000 | Chow et al. |
| 6,149,815 A | 11/2000 | Sauter |
| 6,174,670 B1 | 1/2001 | Wittwer et al. |
| 6,197,563 B1 | 3/2001 | Erlich et al. |
| 6,215,894 B1 | 4/2001 | Zeleny et al. |
| 6,235,473 B1 | 5/2001 | Friedman et al. |
| 6,245,505 B1 | 6/2001 | Todd et al. |
| 6,251,343 B1 | 6/2001 | Dubrow et al. |
| 6,271,024 B1 | 8/2001 | Sve et al. |
| 6,274,089 B1 | 8/2001 | Chow et al. |
| 6,284,113 B1 | 9/2001 | Bjornson et al. |
| 6,296,702 B1 | 10/2001 | Bryning et al. |
| 6,306,578 B1 | 10/2001 | Schellenberger et al. |
| 6,309,600 B1 | 10/2001 | Hunter |
| 6,309,828 B1 | 10/2001 | Schleifer et al. |
| 6,312,103 B1 | 11/2001 | Haluzak |
| 6,326,083 B1 | 12/2001 | Yang et al. |
| 6,337,435 B1 | 1/2002 | Chu et al. |
| 6,353,774 B1 | 3/2002 | Goldenberg et al. |
| 6,376,256 B1 | 4/2002 | Dunnington et al. |
| 6,387,331 B1 | 5/2002 | Hunter |
| 6,391,559 B1 | 5/2002 | Brown et al. |
| 6,399,396 B1 | 6/2002 | Bass |
| 6,399,952 B1 | 6/2002 | Maher et al. |
| 6,404,166 B1 | 6/2002 | Puchianu et al. |
| 6,406,869 B1 | 6/2002 | Glickman et al. |
| 6,410,331 B1 | 6/2002 | Schultz et al. |
| 6,429,025 B1 | 8/2002 | Parce et al. |
| 6,436,632 B2 | 8/2002 | Schellenberger et al. |
| 6,447,661 B1 | 9/2002 | Chow et al. |
| 6,451,188 B1 | 9/2002 | Sundberg et al. |
| 6,454,924 B2 | 9/2002 | Jedrzejewski et al. |
| 6,468,761 B2 | 10/2002 | Yang et al. |
| 6,485,690 B1 | 11/2002 | Pfost et al. |
| 6,485,944 B1 | 11/2002 | Church et al. |
| 6,495,104 B1 | 12/2002 | Unno et al. |
| 6,495,369 B1 | 12/2002 | Kercso et al. |
| 6,496,369 B2 | 12/2002 | Nakamura et al. |
| 6,503,757 B1 | 1/2003 | Chow |
| 6,509,059 B2 | 1/2003 | Yang et al. |
| 6,514,750 B2 | 2/2003 | Bordenkircher et al. |
| 6,544,737 B1 | 4/2003 | Blumenfeld et al. |
| 6,551,836 B1 | 4/2003 | Chow et al. |
| 6,565,813 B1 | 5/2003 | Garyantes |
| 6,572,828 B1 | 6/2003 | Potyrailo et al. |
| 6,576,478 B1 | 6/2003 | Wagner et al. |
| 6,579,358 B2 | 6/2003 | Delucas et al. |
| 6,579,367 B2 | 6/2003 | Vann et al. |
| 6,582,914 B1 | 6/2003 | Caldwell et al. |
| 6,630,835 B2 | 10/2003 | Cheng et al. |
| 6,632,629 B2 | 10/2003 | Yang et al. |
| 6,638,761 B2 | 10/2003 | Shin et al. |
| 6,642,000 B1 | 11/2003 | Strizhkov et al. |
| 6,649,402 B2 | 11/2003 | Van der Weide et al. |
| 6,660,367 B1 | 12/2003 | Yang et al. |
| 6,664,044 B1 | 12/2003 | Sato et al. |
| 6,677,151 B2 | 1/2004 | Sandell |
| 6,682,702 B2 | 1/2004 | Barth et al. |
| 6,689,323 B2 | 2/2004 | Fisher et al. |
| 6,703,236 B2 | 3/2004 | Atwood |
| 6,706,538 B1 | 3/2004 | Karg et al. |
| 6,713,309 B1 | 3/2004 | Anderson et al. |
| 6,716,629 B2 | 4/2004 | Hess et al. |
| 6,730,883 B2 | 5/2004 | Brown et al. |
| 6,737,026 B1 | 5/2004 | Bergh et al. |
| 6,743,633 B1 | 6/2004 | Hunter |
| 6,812,030 B2 | 11/2004 | Ozbal et al. |
| 6,821,486 B1 | 11/2004 | Akporiaye et al. |
| 6,827,831 B1 | 12/2004 | Chow et al. |
| 6,841,193 B1 | 1/2005 | Yang et al. |
| 6,841,663 B2 | 1/2005 | Lefkowitz et al. |
| 6,844,161 B2 | 1/2005 | Siani et al. |
| 6,848,462 B2 | 2/2005 | Covington et al. |
| 6,849,127 B2 | 2/2005 | Vann et al. |
| 6,858,185 B1 | 2/2005 | Kopf-Sill et al. |
| 6,878,554 B1 | 4/2005 | Schermer et al. |
| 6,893,877 B2 | 5/2005 | Hunter et al. |
| 6,943,035 B1* | 9/2005 | Davies et al. .................. 436/180 |
| 6,969,489 B2 | 11/2005 | Freeman |
| 8,969,489 | 11/2005 | Freeman |
| 7,133,726 B1 | 11/2006 | Atwood et al. |
| 7,211,148 B2 | 5/2007 | Bryning et |
| 7,223,363 B2 | 5/2007 | McNeely et al. |
| 7,300,798 B2 | 11/2007 | Perbost et al. |
| 7,332,271 B2 | 2/2008 | O'Keefe et al. |
| 7,390,457 B2 | 6/2008 | Schembri |
| 2001/0046702 A1 | 11/2001 | Schembri |
| 2001/0053334 A1 | 12/2001 | Chen et al. |
| 2001/0055765 A1 | 12/2001 | O'Keefe et al. |
| 2002/0001544 A1 | 1/2002 | Hess et al. |
| 2002/0001546 A1 | 1/2002 | Hunter et al. |
| 2002/0003177 A1 | 1/2002 | O'Connor et al. |
| 2002/0015994 A1 | 2/2002 | Schellenberger et al. |
| 2002/0049196 A1 | 4/2002 | Carpino et al. |
| 2002/0072096 A1 | 6/2002 | O'Keefe et al. |
| 2002/0094533 A1* | 7/2002 | Hess et al. ....................... 435/6 |
| 2002/0110900 A1 | 8/2002 | Jovanovich et al. |
| 2002/0119578 A1 | 8/2002 | Zaffaroni |
| 2002/0151040 A1 | 10/2002 | O'Keefe et al. |
| 2002/0176804 A1 | 11/2002 | Strand et al. |
| 2002/0192716 A1 | 12/2002 | Schellenberger et al. |
| 2003/0003036 A1 | 1/2003 | Rouleau et al. |
| 2003/0039585 A1 | 2/2003 | Freeman |
| 2003/0064507 A1 | 4/2003 | Gallagher et al. |
| 2003/0080087 A1 | 5/2003 | Stelzle |
| 2003/0108726 A1 | 6/2003 | Schembri et al. |
| 2003/0119042 A1 | 6/2003 | Franco De Sarabia Rosado et al. |
| 2003/0124716 A1 | 7/2003 | Hess et al. |
| 2003/0170610 A1 | 9/2003 | Cima et al. |
| 2003/0180807 A1 | 9/2003 | Hess et al. |
| 2003/0186350 A1 | 10/2003 | Newell |
| 2003/0207099 A1 | 11/2003 | Gillmor et al. |
| 2003/0219716 A1 | 11/2003 | Avdeef et al. |
| 2004/0023223 A1 | 2/2004 | Thompson et al. |
| 2004/0037748 A1 | 2/2004 | Hasan et al. |
| 2004/0109793 A1 | 6/2004 | McNeely et al. |
| 2004/0132040 A1 | 7/2004 | Hamill |
| 2004/0141880 A1 | 7/2004 | Handler et al. |
| 2004/0171166 A1 | 9/2004 | Hunter |
| 2004/0191924 A1 | 9/2004 | Hunter et al. |
| 2004/0208792 A1 | 10/2004 | Linton et al. |
| 2004/0209303 A1 | 10/2004 | Martin |
| 2004/0235005 A1 | 11/2004 | Friedlander et al. |
| 2004/0241636 A1 | 12/2004 | Michnick et al. |
| 2005/0059074 A1 | 3/2005 | Schellenberger et al. |
| 2005/0079105 A1 | 4/2005 | Hunter et al. |
| 2005/0118073 A1 | 6/2005 | Facer et al. |
| 2005/0130213 A1 | 6/2005 | Morrison |
| 2005/0148066 A1 | 7/2005 | O'Keefe et al. |
| 2005/0214173 A1 | 9/2005 | Facer et al. |
| 2005/0220675 A1 | 10/2005 | Reed et al. |
| 2005/0266582 A1 | 12/2005 | Modlin et al. |
| 2006/0057209 A1 | 3/2006 | Chapman et al. |
| 2006/0105433 A1 | 5/2006 | Bickmore et al. |
| 2006/0183171 A1 | 8/2006 | Schellenberger et al. |
| 2006/0194108 A1 | 8/2006 | Drews et al. |
| 2008/0108112 A1 | 5/2008 | O'Keefe et al. |

FOREIGN PATENT DOCUMENTS

| | | |
|---|---|---|
| EP | 0402888 | 12/1990 |
| EP | 0 506 993 | 10/1992 |
| EP | 0506993 | 10/1992 |
| EP | 0882593 | 12/1998 |

(56) References Cited

FOREIGN PATENT DOCUMENTS

| | | |
|---|---|---|
| EP | 1155742 A2 | 11/2001 |
| JP | 63107057 | 5/1988 |
| JP | 02 241539 A | 9/1990 |
| JP | 05-504627 T | 7/1993 |
| JP | 09-061310 A | 3/1997 |
| JP | 2000-28623 | 1/2000 |
| JP | 2000-028623 A | 1/2000 |
| JP | 2000-88863 | 3/2000 |
| JP | 2000-088863 A | 3/2000 |
| JP | 2000-287670 | 10/2000 |
| JP | 2000-287670 A | 10/2000 |
| JP | 2001-501967 A | 2/2001 |
| JP | 2001/083163 | 3/2001 |
| JP | 2001-503841 A | 3/2001 |
| JP | 2001-211873 | 8/2001 |
| JP | 2001-211873 A | 8/2001 |
| JP | 2002-27984 | 1/2002 |
| JP | 2002-027984 A | 1/2002 |
| JP | 2002-500098 A | 1/2002 |
| JP | 2002-500373 A | 1/2002 |
| JP | 2002-189033 | 7/2002 |
| JP | 2002-189033 A | 7/2002 |
| JP | 2002-283305 | 10/2002 |
| WO | 91/13335 | 9/1991 |
| WO | WO-91/13335 | 9/1991 |
| WO | WO-9501559 | 1/1995 |
| WO | WO-9511755 | 5/1995 |
| WO | 96/04547 A1 | 2/1996 |
| WO | WO-97/00941 | 1/1997 |
| WO | WO-97/00943 | 1/1997 |
| WO | WO-9715394 | 5/1997 |
| WO | WO-97/36167 | 10/1997 |
| WO | WO-97/37036 | 10/1997 |
| WO | WO-98/45406 | 10/1998 |
| WO | WO-98/47003 | 10/1998 |
| WO | WO-99/11373 | 3/1999 |
| WO | WO-99/19510 | 4/1999 |
| WO | WO-99/34920 | 7/1999 |
| WO | WO-9939829 | 8/1999 |
| WO | WO-99/47922 | 9/1999 |
| WO | WO-99/52560 | 10/1999 |
| WO | WO-99/55461 | 11/1999 |
| WO | WO-99/61152 A1 | 12/1999 |
| WO | WO00/01798 A | 1/2000 |
| WO | 00/54883 A1 | 9/2000 |
| WO | WO-00/51735 | 9/2000 |
| WO | WO-00/56456 | 9/2000 |
| WO | WO00/151735 | 9/2000 |
| WO | 01/30499 A1 | 5/2001 |
| WO | WO-01/38583 | 5/2001 |
| WO | WO-01/61054 | 8/2001 |
| WO | WO-01/87335 | 11/2001 |
| WO | 02/30561 A2 | 4/2002 |
| WO | WO02/26394 A1 | 4/2002 |
| WO | WO-02/30561 | 4/2002 |
| WO | WO-02/40158 | 5/2002 |
| WO | 02/055199 A2 | 7/2002 |
| WO | WO-02/055199 | 7/2002 |
| WO | WO02/055199 A2 | 7/2002 |
| WO | WO-02/078834 | 10/2002 |
| WO | WO-02/087764 | 11/2002 |
| WO | WO-02/87764 | 11/2002 |
| WO | WO-02/89982 | 11/2002 |
| WO | WO-03/02226 | 1/2003 |
| WO | WO-03/002226 | 1/2003 |
| WO | WO-03/035239 | 5/2003 |
| WO | WO-03/042697 | 5/2003 |
| WO | WO-2004/018104 | 3/2004 |
| WO | WO-2004/074818 A2 | 9/2004 |

OTHER PUBLICATIONS

CA2,495,704, "Non-Final Office Action", Mailed Mar. 2, 2010, 5 pages.
EP03793336.3, "Non-Final Office Action", Mailed Jun. 1, 2010, 4 pages.
EP03793336.3, "Non-Final Office Action", Mailed Oct. 9, 2009, 6 pages.
Tran, Peter H. et al., "Microarray optimization: increasing spot accuracy and automated identification of true microarray signals", Nucleic Acids Research, vol. 30, No. 12 e54, Oxford University Press, Jun. 15, 2002, 9 pages.
4 Birren et al., "Genome Analysis: A Laboratory Manual" v-xii (1999).
A.D. Sauter, Nanoliters onto media: Use of Electric Induction, American Laboratory 40-45 (Oct. 2001).
Da-Sheeng Lee et al., A novel real-time PCR machine with a miniature spectrometer for fluorescence sensing in a micro liter volume glass capillary, 100 Sensors and Actuators B 401-10 (2004).
Tian-Lu Cheng et al., "Membrane-Tethered Proteins for Basic Research, Imaging and Therapy", 28(6) Medical Research Reviews 885-928 (May 14, 2008).
Yasutaka Matsubara et al., "On-chip Nanoliter-vol. Multiplex TaqMan Polymerase Chain Reaction From a Single Copy Based on Counting Fluorescence Released from Microchambers," 76 Anal. Chem. 21, 6434-39 (2004).
Yatsutaka Matsubara et al., "Microchamber array based DNA quantification and specific sequence detection from a single copy via PCR in nanoliter volumes," 20 Biosensors & Bioelectronics 1482-90 (2005).
Patrick Adlercreutz & Bo Mattiasson, "Oxygen Supply to Immobilized Cells," 16 Eur. J. Appl. Biotechnology 165-70 (1982).
CRC Handbook of Chemistry and Physics F-20—F-35 (65th ed. 1984).
Cadus Pharmaceutical Corp, 1997 Annual Report, 1-29, (May 8, 1998).
C.T. Wittwer et al., "The Light Cycler: A Microvolume Multisample Fluorimeter with Rapid Temperature Control", BioTechniques 176-81 (Jan. 1997).
H. Erfle et al., "Simultaneous loading of 200 sample lanes for DNA sequencing on vertical and horizontal standard and ultrathin gels", 25(11) Nucleic Acids Research 2229-30 (1997).
Gavin Macbeath & Stuart L. Schreiber, "Printing Proteins as Microarrays for High-Throughput Function Determination", 289 Science 1760-62 (Sep. 2000).
Sangreet Singh-Gasson et al., "Maskless fabrication of light-directed oligonucleotide microarrays using a digital micromirror array", 17 Nature Biotechnology 974-78 (Oct. 1999).
Bert Vogelstein & Kenneth W. Kinzler, "Digital PCR", 96 Proc. Nat'l. Acad. Sci. USA 9236-41 (Aug. 1999).
Douglas E. Smith et al., "Dynamical Scaling of DNA Diffusion Coefficients", 29 Macromolecules 1372-73 (1996).
Yvonne R. Thorstenson et al., "Global Analysis of ATM Polymorphism Reveals Significant Functional Constraint", 69 Am. J. Hum. Genet. 396-412 (2001).
Carl T. Wittwer et al., "Continuous Fluorescence Monitoring of Rapid Cycle DNA Amplification", 22 BioTechniques 130-38 (Jan. 1997).
Tanya S. Kanigan at al., "Living Chips for Drug Discovery", 3926 Proc. SPIE 172-80 (2000).
Colin J. Brenan, "A massively parallel microfluidics platform for storage & ultra high throughput screening", 4626 Proc. SPIE 560-69 (2002).
Luke Sosnowski, "Manufacturing Methods for High Density Micro-Channel Arrays" (Jun. 2000) (Masters Thesis, Massachusetts Institute of Technology Mechanical Engineering Dep't.).
CRC Handbook of Chemistry and Physics, (Robert C. Weast ed., 65th ed. 1984-85).
Adlercreutz et al., "Oxygen Supply to Immobilized Cells," European Journal of Applied Microbiology Biotechnology, vol. 16 pp. 165-170 (1982).
Wittwer et al., "The Light Cycler: A Microvolume Multisample Fluorimeter with Rapid Temperature Control", BioTechniques, Jan. 1997, pp. 176-181.
Kanigan et al., "Living Chips for Drug Discovery", Mar. 2000, Proceedings of SPIE, vol. 3926, pp. 172-180.

(56) References Cited

OTHER PUBLICATIONS

Luke Sosnowski, "Manufacturing Methods for High Density Micro-Channel Arrays" (Master's Thesis) (Massachusetts Institute of Technology Dep't of Mechanical Engineering) (Jun. 2000).
Cadus Pharmaceutical Corp, 1997 Annual Report 1-29 (May 8, 1998).
H. Erfle et al., "Simultaneous loading of 200 sample lanes for DNA sequencing on vertical and horizontal, standard and ultrathin gels", 25(11) Nucleic Acids Research 2229-30 (1997).
MacBeath et al., "Printing Proteins as Microarrays for High-Throughput Function Determination" 289 Science 1760-62 (Sep. 2000).
Singh-Gasson et al., "Maskless fabrication of light-directed oligonucleotide microarrays using a digital micromirror array" 17 Nature Biotechnology 974-78 (Oct. 1999).
Vogelstein et al., "Digital PCR" 96 Proc. Natl. Acad. Sci. USA 9236-41 (Aug. 1999).
Smith et al., "Dynamical Scaling of DNA Diffusion Coefficients" 29 Macromolecules 1372-73 (1996).
Thorstenson et al., "Global Analysis of ATM Polymorphism Reveals Significant Functional Constraint" 69 Am. J. Hum. Genet. 396-412 (2001).
Wittwer et al., "Continuous Fluorescence Monitoring of Rapid Cycle DNA Amplification", 22 BioTechniques 130-38 (Jan. 1997).
Zhao et al., Directed Evolution Converts Subtilisin E into a Functional Equivalent of Thermitase, vol. 12, No. 1, pp. 47-53 (1999).
J.H. Brown, Charts for Counting Bacterial Colonies, 37 Am. J. Pub. Health Nations Health 206-07 (1947).
Coleman et al., Phospholipid Synthesis in Isolated Fat Cells, 252 J. Biological Chem. 3050-56 (1977).
Colin S. Cooper, Applications of microarray technology in breast cancer research, 3(3) Breast Cancer Res. 158-75 (2001).
S.D. Gillmor et al., Low-Contact-Angle Polydimethyl Siloxane (PDMS) Membranes for Fabricating Micro-Bioarrays, Proc. 2d Ann. Int'l IEEE-EMBS Spec. Topic Conf. on Microtechnologies in Med. & Bio. 51 (A. Dittmar, ed. 2002).
de Macario et al., 121 Methods in Ezymology 509-25 (1986).
de Macario et al., Adaptation of the Slide Immuneozymatic Assay for Quantification of DNA Hybridization: SIA-DNA, 8 Biotechniques 210-17 (1990).
L.J. Kricka & P. Wilding, Microchip PCR, 377 Anal. Bioanal. Chem. 820-25 (2003).
A.F.R. Huhmer & J.P. Landers, Noncontact Infrared-Mediated Thermocycling for Effective Polymerase Chain Reaction Amplification of DNA in Nanoliter Volumes, 72 Anal. Chem. 5507-12 (2000).
Mann A. Shoffner et al. Chip PCR. I. Surface passivation of microfabricated silicon-glass chips for PCR, 24(2) Nucleic Acids Research 375-79 (1996).
Hidenori Nagai et al., "High-throughput PCR in silicon based microchamber array," 16 Biosensors & Bioelectronics 1015-19 (2001).
Hidenori Nagai et al., "Development of a Microchamber Array for Picoliter PCR," 73 Anal. Chem. 73, 1043-47 (2001).
Adam Steel et al, The Flow-Thru Chip™: A Three-Dimensional Biochip Platform, in Microarray Biochip Technology 87-117 (Mark Schena ed. 2000).
Ausubel, et al., "Current Protocols in Molcular Biology" iii-xii (1987).
Birren et al., "Genome Analysis: A Laboratory Manual" v-ix (1999).
de Macario et al., "Slide Immunoenzymatic Assay for Human IgE(SIA-IgE)," 90 J. Immunological Methods 137-41 (1986).
Sambrook, et al., "Molecular Cloning: A Laboratory Manual," xi-xxxviii (2d ed. 1989).
Gait, "Oligonucleotide Synthesis: A Practical Approach," vii-xiii (1984).
Maniatis et al., "Molecular Cloning: A Laboratory Manual" v-x (1982).
Taylor et al., "Optimization of the Performance of the Polymerase Chain Reaction in Silicon-Based Microstructures," 25(15) Nucleic Acids Research 3164-68 (1997).
Gregory G. Lennon, "High-throughout gene expression analysis for drug discovery", 5(2) Drug Discovery Today 59-66 (Feb. 2000).
4 Genome Analysis: A Laboratory Manual v-xii (Birren et al., eds. 1999).
Eckstein, "Oligonucleotides and Analogues: A Practical Approach" ix-xvii (1991).
Colin J. Brenan et al., "A massively parallel microfluidics platform for storage and ultra high throughput screening," 4626 Proc. SPIE 560-69 (2002).
Prescott, Microbology 31, 114-16 (1990).
Elizabeth Zubritsky, Spotting a microarray system, 4(5) Modern Drug Discovery 59 (May 2001).
Polokoff et al, Isolation of Somatic Cell Mutants Defective in the Biosynthesis of Phoshatidylethanolamine, 256 J. Biological Chem. 7687-90 (1981).
De Macario et al., "The slide immunoenzyic assay: a simple laboratory tool with multiple applications," 103 Chemical Abstr. 67622 (1985).
Jones, T.B., et al. "Dielectrophoretic Liquid Actuation and Nanodroplet Formation", Journal of Applied Physics, vol. 99, No. 2, Jan. 15, 2001, pp. 1441-1442.
Moerman, R., et al. "Miniaturized Electrospraying as a Technique for the Production of Microarrays of Reproducible Micrometer Sized Protein Spots", In: A. van den Berg, W Olthius, P. Bergveld (eds.); Micro Total Analysis Systems 2000, Proceedings of the µ TAS 200 Symposium, Enschede, May 14-18, 2000, Kluwer Academic Publishers, Dordrecht ISBN 0-7923-6387-6; p. 557-560; OZS BSDL, DIOC IMDS, Zie ook DCT/PART BTA CPi.
Sauter, A.D., et al. "Nanoliters onto media: Use of Electric Induction", American Laboratory, Oct. 2001, pp. 40-45.
Vykoukal, J., et al. A Programmable Dielectrophorectic Fluid Processor for Droplet-Based Chemistry.
PCT/US2003/26441 International Search Report.

\* cited by examiner

MICROFLUIDIC TRANSFER PIN

PRIORITY

This application is a divisional application under 35 U.S.C. §121 of U.S. patent application Ser. No. 10/227,179, filed on Aug. 23, 2002, the contents of which is hereby incorporated by reference herein.

STATEMENT AS TO RIGHTS TO INVENTIONS MADE UNDER FEDERAL SPONSORED RESEARCH AND DEVELOPMENT

This invention was made with government support under Advanced Technology Program Award Number 70NANB1H3003 awarded by the National Institute of Standards and Technology. The government has certain rights in the invention.

FIELD OF THE INVENTION

The invention generally relates to techniques for assaying small volumes of liquid, and more specifically to physical transfer of a small volume into a storage medium.

BACKGROUND ART

Techniques are rapidly developing for parallel performance of a large number of chemical and biological assays and synthesis operations. One approach uses a nanotiter plate having a high density platen of through-hole wells with hydrophilic interiors and openings surrounded by hydrophobic material. This is described, for example, in U.S. Pat. No. 6,387,331 and U.S. Patent Application 20020094533, the contents of which are incorporated herein by reference. One specific commercial example of a nanotiter plate system is the Living Chip™ made by Biotrove, Inc. of Cambridge, Mass. Nanotiter plate technology relies on the ability to handle very small volumes of fluid samples, typically, 100 nanoliters or less. The various considerations taken into account in handling such small liquid samples are known as microfluidics.

Transferring of large collections of fluids such as libraries of small molecule drug candidates, cells, probe molecules (e.g., oligomers), and/or tissue samples stored in older style 96- or 384-well plates into more efficient high density arrays of microfluidic receptacles such as a nanotiter plate can consume one or more hours, during which time samples may evaporate, degrade or become contaminated. It is therefore advantageous to submerse the array in a bath of immiscible fluid. The fluid is ideally electrically insulating, non-conductive and nonflammable, with a relative permittivity >1. One class of fluids that serves this purpose is perfluorinated hydrocarbons, such a perfluorodecalin, perfluorooctane, perfluoropentane, longer chained perfluorocarbons or mixed populations of perfluorocarbons. Hydrocarbons or silicone fluids would also work but are flammable and tend to extract compounds from the sample.

A microfluidic volume of a liquid sample may be loaded into a target receptacle by various means. One established method for transferring a liquid sample to a surface or to another liquid uses a transfer pin loaded with the sample liquid. For example, pins or arrays of pins are typically used to spot DNA samples onto glass slides for hybridization analysis. Pins have also been used to transfer liquids such as drug candidates between microplates or onto gels (one such gel system is being developed by Discovery Partners, San Diego, Calif.). Many pin types are commercially available, of various geometries and delivery volumes. V&P Scientific of San Diego, Calif. makes slotted, grooved, cross-hatched, and other novel-geometry pins. The Stealth Pin by ArrayIt is capable of delivering hundreds of spots in succession from one sample uptake, with delivery volumes of 0.5 nL to 2.5 nL. Majer Precision Engineering sells pins having tapered tips and slots such as the MicroQuil 2000.

U.S. Pat. No. 6,149,815 describes an approach for dispensing liquid samples electrokinetically. A complex apparatus positions a receiver reservoir and a non-conducting liquid dispenser between a ground plate and a high voltage plate, neither plate being electrically connected to a sample. An accurate volume of liquid sample is transferred from the dispenser to the receiver reservoir by precisely controlling the time that a high voltage is applied to the dispenser, the longer the voltage is applied, the greater the volume of sample transferred, and vice versa. As shown in FIG. 1 of the '815 patent, it is important to provide an insulating gap between the electrically charged dispenser and the electrically grounded receiver reservoir. Moreover, the '815 patent approach requires determining by visual observation the relationship between time, voltage, and volume of liquid transferred. Nonetheless, the '815 patent does suggest that high voltage electric potential may be useful for transferring liquid samples from a loaded transfer pin.

SUMMARY OF THE INVENTION

A representative embodiment of the present invention includes a liquid dispenser for a microfluidic assay systems including systems for arraying samples for storage, screening and synthesis. The dispenser includes at least one transfer pin for transferring a microfluidic sample of liquid to a target receptacle. A pin tip at one end of the transfer pin is structured to cooperate with an opening in the target receptacle. The tip uses a high voltage potential to transfer the sample from the pin to the receptacle.

In a further embodiment, the target receptacle is one of an array of through-holes wells or closed-end wells in a platen. The target receptacle may have hydrophilic walls that attract the sample. The target receptacle may have an opening surrounded by hydrophobic material. The target receptacle may be filled with a porous hydrophilic material. A transfer pin array may include multiple transfer pins for transferring multiple samples to corresponding target receptacles. Individual transfer pins in the array may be individually actuable, as would be useful for producing patterns or layered patterns of samples. Typically the spacing of pins in the array will match a subset of a source array such as a 384 well microtiter plate as well as the spacing of the receptacle array. At least one transfer pin in the array may be independently positionable to align the at least one independently positionable pin with respect to the opening of a target receptacle. Positioning systems are typically capable of accurate movement in at least the x, y and z co-ordinates. Individual transfer pins in the array may be free floating or spring loaded.

In various embodiments, the microfluidic sample may be from 0.2 to 100 nanoliters. The transfer pin may have a diameter greater than the opening of the target receptacle. The sample may be a polar liquid such as aqueous, DMSO, dimethylformamide (DMF), or acetonitrile solutions. The high voltage potential may be between 100V and 5 kV. The at least one transfer pin may be able to dispense multiple samples without replenishment.

In a further embodiment, a voltage control module controls when the high voltage potential is applied to and removed from the pin tip. The voltage control module may operate to apply the high voltage potential to the pin tip before or after the transfer pin is positioned at the target receptacle, and to remove the high voltage potential before or after the transfer pin is moved away from the target receptacle. The voltage control module may include a resistor network and/or a controllable switch in series with the transfer pin.

Embodiments of the present invention also include a method for use in dispensing a microfluidic sample of a liquid. The method includes providing at least one transfer pin for transferring a microfluidic sample of liquid to a target receptacle. One end of the transfer pin may have a pin tip structured to cooperate with an opening in the target receptacle. Voltage is applied between the transfer pin and the target receptacle for transferring the sample from the at least one transfer pin to the target receptacle.

In such an embodiment, the target receptacle may be a through-hole well or a closed-end well in a platen array. The target receptacle also may include hydrophilic walls that attract the sample and/or an opening surrounded by hydrophobic material. The voltage may be applied to either the transfer pin or the target receptacle.

The method may also include providing a transfer pin array including multiple transfer pins for transferring multiple samples to corresponding multiple target receptacles. Individual transfer pins in the array may be individually-actuable, either sequentially or in parallel. At least one transfer pin in the array may be independently positionable for alignment with respect to the opening of a target receptacle. Individual transfer pins in the array may be free floating or spring loaded.

In such a method, the microfluidic sample may be from 0.2 to 100 nanoliters. The transfer pin may have a diameter greater than the opening of the target receptacle. The sample may be a polar liquid such as aqueous, DMSO, dimethylformamide (DMF), or acetonitrile solutions. The high voltage potential may be between 100V and 5 kV. The high voltage potential may be applied before or after the transfer pin is positioned at the target receptacle, and removed after the transfer pin is moved away from the target receptacle. The controlling step may use a resistor network and/or a controllable switch in series with the transfer pin. The at least one transfer pin may be able to dispense multiple samples without replenishment.

The method may further include applying evaporation control measures to the target receptacle. This may include immersing the target receptacle in an immiscible liquid such as a perfluorinated hydrocarbon. Alternatively, or in addition, the evaporation control measures may include at least one of humidity control, fluid pressure, and receptacle cooling.

The method may also further include positioning the transfer pin in direct contact with target receptacle, or positioning the transfer pin near the target receptacle without direct contact. The method may also include sequentially transferring multiple samples to the target receptacle to produce a layered pattern of samples.

Another embodiment of the present invention includes a microfluidic assay system. The system includes at least one liquid sample storage device including multiple storage receptacles, a microfluidic dispenser, and a dispenser positioning module. The microfluidic dispenser has a high voltage supply that develops a high voltage potential; at least one transfer pin for transferring a microfluidic sample of liquid to a target storage receptacle, one end of the transfer pin having a pin tip structured to cooperate with an opening in the target storage receptacle; and a voltage controller for applying the high voltage potential from the high voltage supply between the transfer pin and the target storage receptacle for transferring the sample from the at least one transfer pin to the target storage receptacle. The dispenser positioning module positions the liquid dispenser to enable the transfer pin to cooperate with the target receptacle for transferring the sample.

In a further such embodiment, the storage device may be a platen array of through-holes or wells. The voltage may be applied to the transfer pin or to the target storage receptacle. The target storage receptacle may include hydrophilic walls that attract the sample and/or an opening surrounded by hydrophobic material. The liquid dispenser may also include a transfer pin array including multiple transfer pins for transferring multiple samples to corresponding multiple target storage receptacles. Transfer pins in the array may be individually actuable, either sequentially or in parallel. At least one transfer pin in the array may be independently positionable for alignment with respect to the opening of a target storage receptacle. Individual transfer pins in the array also may be free floating or spring loaded.

In such a system, the microfluidic sample may be from 0.2 to 100 nanoliters. The transfer pin may have a diameter greater than the opening of the target storage receptacle. The sample may be a polar liquid such as aqueous, DMSO, dimethylformamide (DMF), or acetonitrile solutions. The high voltage potential may be between 100V and 5 kV.

The voltage controller may apply the high voltage potential to the pin tip before or after the transfer pin is positioned at the target storage receptacle, and removes the high voltage potential after the transfer pin is moved away from the target storage receptacle. The voltage controller also may use a resistor network and/or a controllable switch in series with the transfer pin.

In a system, the storage device may use evaporation control measures to control evaporation of samples from the storage receptacles. This may include immersing the storage receptacles in an immiscible liquid such as a perfluorinated hydrocarbon and/or at least one of humidity control, fluid pressure, and receptacle cooling.

The positioning module may position the dispenser so that the at least one transfer pin makes direct contact with target storage receptacle for transferring the sample, or so that the at least one transfer pin is near the target storage receptacle without direct contact for transferring the sample.

The liquid dispenser may operate to sequentially transfer multiple samples to the target storage receptacle to produce a layered pattern of samples. The at least one transfer pin may be able to dispense multiple samples without replenishment.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Various embodiments of the present invention are directed to applying a high voltage to one or more transfer pins for transferring a microfluidic volume of a liquid sample to a suitable target receptacle. The target storage receptacle typically will have an affinity for the sample, and could be a flat surface; a surface with indentations, close ended wells, or pores; a membrane or filter; a gel; or a platen with close-ended wells or through-hole wells. In one specific embodiment, the target receptacle is one or more wells in an array of through-hole wells as part of a parallel and/or series sample transfer process. In other embodiments, the target storage receptacle may be a hydrophilic spot or divot in a hydrophobic background. Such an environment may be established on a coated glass slide such as the ones available from Erie Scientific of Portsmouth, N.H.

Figure 1:
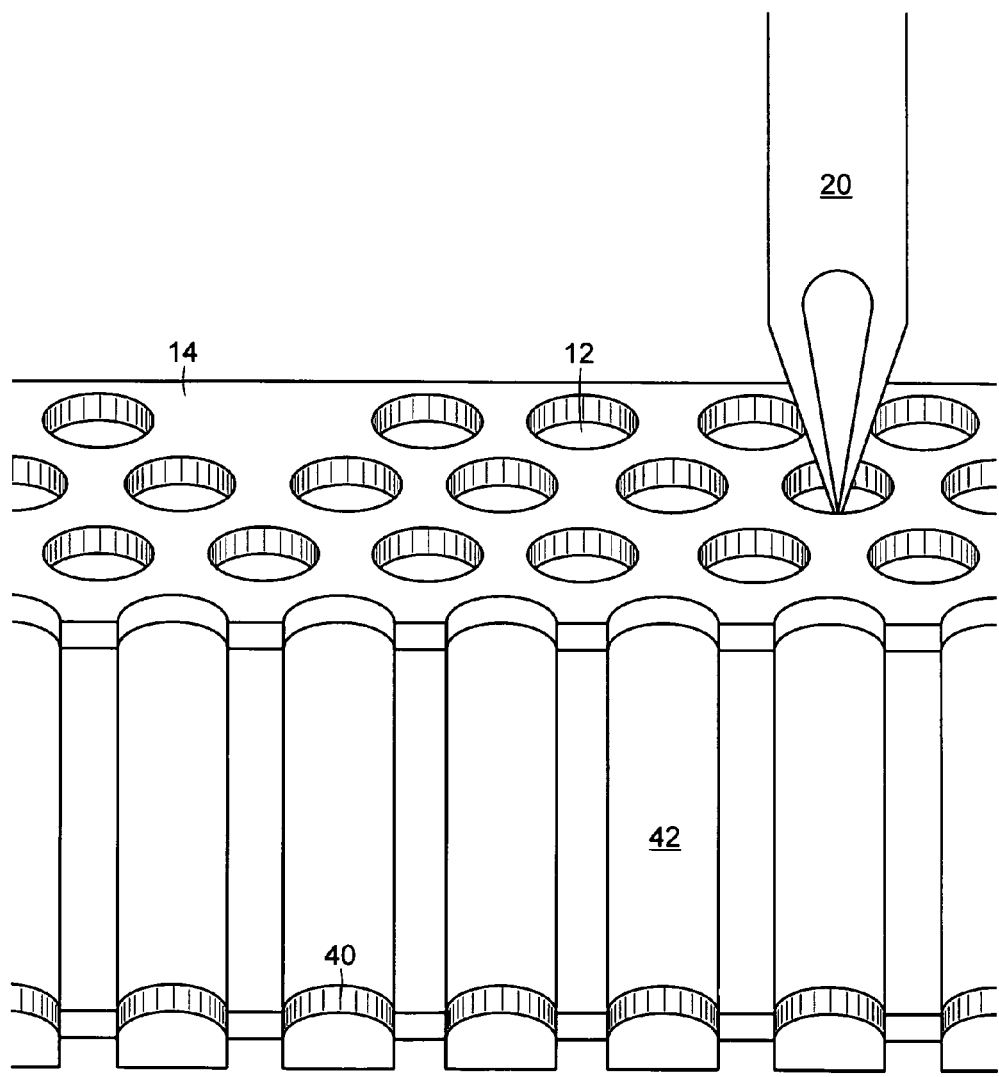
FIG. 1 shows a cut away view of a nanotiter plate having one of its through wells being loaded by a transfer pin bearing a liquid sample according to one embodiment of the present invention.

FIG. 1 shows a cut away view of a nanotiter plate having one of its through-hole wells being loaded by a transfer pin bearing a liquid sample according to one embodiment of the present invention. Platen 10 contains a large number of through-hole wells 12 that traverse the platen 10 from one planar surface 14 to the other opposing planar surface (not shown). The platen 10 is may be from 0.1 mm to more than 10 mm thick; for example, around 0.3 to 1.52 mm thick, and commonly 0.5 mm. The thickness of platen 10 is also the length of the through-hole wells 12 when they are oriented perpendicularly to planar surface 14. The length and volume of the wells 12 can be increased somewhat by orienting them at an angle to surface 14.

Typical microfluidic volumes of the through-hole wells 12 could be from 0.1 picoliter to 1 microliter, with common volumes in the range of 0.2-100 nanoliters. Capillary action or surface tension of the liquid samples may be used to load the wells 12. To enhance the drawing power of the wells 12, the target area of the receptacle, interior walls 42, may have a hydrophilic surface that attracts a liquid sample. Alternatively, the wells 12 may contain a porous hydrophilic material that attracts a liquid sample. To prevent cross-contamination (crosstalk), the exterior planar surfaces 14 of platen 10 and a layer of material 40 around the openings of wells 12 may be of a hydrophobic material. Thus, each well 12 has an interior hydrophilic region bounded at either end by a hydrophobic region.

In some systems, the well 12 may be submersed in an immiscible, non-conducting liquid such as perfluorinated hydrocarbon, hydrocarbon, or silicone fluid. An immiscible liquid prevents evaporation of samples from the wells 12 and further protects the samples from cross-communication. Of course, other evaporative control measures may also be useful, including without limitation, humidity control, fluid pressure, platen cooling, etc.

Transfer pin 20 is generally dowel-shaped, made of stainless steel, titanium, or other durable material, with a flat, rounded, tapered, or cupped tip. Typically, although not necessarily, the diameter of the transfer pin 20 is greater than the diameter of the wells 12 in order to have more rigidity in the pin and to allow the pin to reliably contact the side walls of the well. Transfer pin 20 may also have slots, grooves or spirals cut into it to increase volumetric capacity and/or to better meter the dispensing action. Transfer pin 20 may be capable of holding and/or delivering anywhere from 0.1 picoliters to more than 10 microliters, but typically holds 0.1 nanoliters to 4 microliters.

FIG. 1 shows an embodiment of the transfer pin 20 having a tapered tip with a tapered slot that holds the liquid sample. In such an embodiment, the tapered end is small enough to fit inside the well 12, but the overall pin diameter is still larger than the diameter of the well. In the embodiment shown, the tapered end of the transfer pin 20 forms a 40 degree angle, and the tapered slot within this end forms a 14 degree angle. This transfer pin 20 holds adequate amounts of sample (~0.5 µl), facilitates wicking of the sample to the tip of the pin, and can fill multiple wells 12 in succession without replenishment. In an alternative embodiment, the transfer pin 20 is a simple stainless steel dowel with a slot in the end.

Transfer pin 20 may be free to move perpendicular to the surface 14 of the platen 10, but movement may be constrained in a plane parallel to the surface; this implementation is referred to as a floating pin. However, alternative embodiments of the invention may also be implemented with fixed transfer pins 20 as well. It is generally desirable to achieve good contact between the transfer pin 20 and the target area, but not to damage the target receptacle, well 12. This objective may be achieved by using a floating model transfer pin 20. Floating gravity-fed or spring-loaded transfer pins 20 help with reliable positioning of multiple pins to properly contact corresponding wells 12 to overcome minor errors in alignment. In some embodiments, spring-loaded transfer pins 20 may be used, preferably with "soft" springs having a spring constant that allows for relatively large displacement with a small applied force. In other embodiments, gravity-fed floating transfer pins 20 may be more advantageous in applying minimum force to a target well 12. However, gravity-fed transfer pins 20 may occasionally stick in one position following a sample dispensing cycle. One solution to this problem is to use a pressure or vacuum manifold to assist with pin positioning, such as a vacuum manifold that sucks the transfer pin 20 back into position between dispensing cycles. Floating transfer pins 20 may also use magnetism or electro-magnetism for pin positioning, such as use of a strong magnetic field for uniformly extending pins, use of magnetic pins, or by accelerating and rapidly decelerating individual pins or the entire array.

Typically, transfer pin 20 is loaded with a liquid sample for transfer to platen 10. In typical embodiments, the sample liquid may be an aqueous, DMSO, dimethylformamide (DMF), or acetonitrile solution. Then, transfer pin 20 is moved to a position over the well 12 to be loaded. The transfer pin 20 is lowered until contact is made with the opening of the well 12. When the tip of transfer pin 20 is tapered, as shown in FIG. 1, there is maximal contact between the outer surface of the pin and the surface of the interior walls 42 of well 12. Such maximal contact between pin tip and well wall is desirable because the sample liquid held in the transfer pin 20 needs to contact the interior wall 42 of the well 12 in order for transfer from the pin to be initiated. Furthermore, a tapered pin tip can correct for slight errors in pin placement with respect to the wells, as the taper of the transfer pin 20 guides it into the exact desired position.

Once the transfer pin 20 is positioned in contact with the opening of well 12, a portion of the liquid in the pin will be wicked by capillary action into the well 12 (and displace any immiscible liquid which may previously have been stored therein). The volume of liquid sample that is transferred is self-metered by the volume of the well 12, and subject to other environmental variables, such as the action of the layers of hydrophilic and hydrophobic materials, whether the target area is under an immiscible fluid, and if so, the height of the immiscible fluid over the target area, the duration of contact with the area, the speed of withdrawal from the area, and various of the other variables listed above with respect to pin transfer.

Initializing the wicking action and wetting the interior walls 42 of the well 12 is an important point in the transfer process. Occasionally, for a variety of reasons, not all of which are well understood, there will be difficulty establishing this wicking flow. Embodiments of the present invention are directed at overcoming such difficulties in initiating the transfer of a liquid sample to a storage receptacle by applying an electric potential. Although this approach may be useful for non-polar liquids, it is especially useful for transferring samples of polar liquids such as aqueous, DMSO, dimethylformamide (DMF), or acetonitrile solutions can be transferred into a target well 12 by contacting a transfer pin 20 filled with sample and applying a high voltage with low current (typically less than 5 microamps).

Embodiments of the present invention use the existing transfer pin and platen well arrangement described with respect to FIG. 1 above, and add a high voltage potential to the transfer pin 20, or at least the tip of the pin. Such an arrangement differs from that described in the '815 patent in that it avoids the need for a complex plate insulation arrangement (as shown in its FIG. 1), and it does not use the electrokinetic relationship of voltage-time to volume transferred. In embodiments where transfer pin 20 is in direct contact with the receptacle target area, the electric charge applied to transfer pin 20 is not directly related to the duration of the sample transfer or the amount dispensed. That purpose is accomplished by hydrophilic attraction of the interior walls 42 and the self-metering action of the platen wells 12. Rather the electrical charge on the transfer pin 20 serves as an activation energy that excites the liquid held by the pin to encourage the wetting of a liquid bridge flow channel between the transfer pin 20 and the interior walls 42 of well 12. The amount of sample that is dispensed in a specific embodiment is dependent upon a multitude of variables such as pin geometry, pin coating, sample surface tension, wetted depth, speed of transfer, sample viscosity, sample conductivity, the concentration of particles in the sample, voltage level, voltage duration, voltage frequency, and loading environment (e.g., air vs. under liquid). Careful control of these variables is required. In some embodiments, it may be useful to apply the voltage to the well 12 rather than to the transfer pin 20.

The voltage necessary to effect sample transfer depends on the physical properties of the sample and the receptacle, i.e., well 12, including their affinity for each other. In addition, the choice between AC and DC voltage supplies may affect the voltage necessary for transfer of a liquid sample, but both types of supplies are acceptable. Generally, the voltage will be between 10V and 50 kV, typically in the range of 100V to 5 kV. The choice of voltage level is affected by effects of ohmic-related heating and material breakdown characteristics. With a high dielectric constant liquid, a high voltage of large voltage pulse may be applied without electrical breakdown.

It is desirable to limit the current flowing from the transfer pin 20 in order to prevent electrical heating, etching and ionization of the sample, receptacle, pins, air, or immiscible fluid. Therefore, it is important to use a high-voltage, low current system. Examples high-voltage, low current sources include a Van De Graaf generator, or a standard high voltage source in series with a high-voltage, high-resistance resistor.

In one specific embodiment, the voltage is applied to the transfer pin 20 after it is positioned at the opening of the desired well 12, and the voltage is removed after the sample has been transferred to the well 12 and the transfer pin 20 has been withdrawn from the opening of the well 12. In other embodiments, the voltage may be applied to the transfer pin 20 before it is positioned at the opening of the desired well 12, and the voltage is removed after the sample has been transferred to the well 12 but before the transfer pin 20 has been withdrawn from the opening of the well 12.

In addition, voltage aided sample transfer in various embodiments may be based on either full, partial, or no physical contact between the transfer pin 20 and the target well 12. That is, in some embodiments, the end of the transfer pin 20 may be brought into substantial physical contact with a portion of the target well 12 in order to transfer a liquid sample from the pin to the well. In other embodiments, the transfer pin 20 approaches the opening of the target well 12 without actually establishing significant contact in order to transfer a liquid sample from the pin to the well. Some embodiments with or without contact may benefit from electrospray effect to transfer a sample from the transfer pin 20 to the target well 12.

In various embodiments, either the target well 12 or the entire platen 10 may be electrically grounded. In other embodiments, the platen 10 and well 12 may be ungrounded. Either approach may be successful so long as there is an appropriate voltage difference between the transfer pin 20 and the target well 12. In addition, the platen 10, itself, may be made of conductive material, or non-conductive material. Moreover, specific embodiments may not necessarily require a combination of hydrophilic and hydrophobic materials as described with respect to FIG. 1, but may be able to exploit the invention using receptacle structures without any significant hydrophobic or hydrophilic characteristics, or in ones with all hydrophobic or all hydrophilic materials.

The efficiency of voltage aided sample transfer also may depend on the relative geometries of the transfer pin 20 and the target well 12. For example, a transfer pin 20 with a tapered point such as shown in FIG. 1, may be more effective than a different shaped end such as a flat one. In one specific embodiment in which the well 12 is 280 microns in diameter, a pointed pin tip of less than 200 microns, e.g., 140 microns, may be most effective. In some specific embodiments, a blunt pin tip also may work, but in other embodiments, such as under dense fluids, a blunt pin tip without a sufficient point on its end may not be operable in a voltage aided transfer arrangement since the liquid may climb the sides of the transfer pin 20.

Figure 2:
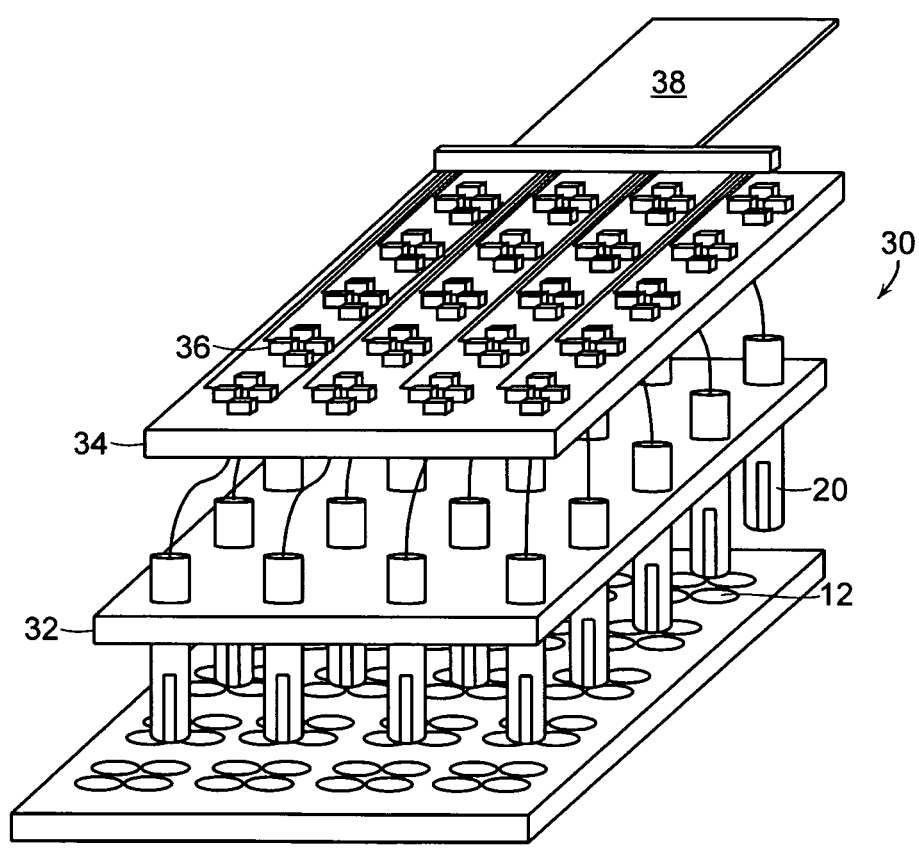
FIG. 2 shows an elevated side view of an array of transfer pins according to one embodiment of the present invention.

In addition to use of an individual transfer pin 20 as shown in FIG. 1, an embodiment may be based on a multiple pin array 30, such as the one shown in FIG. 2, which is designed so that each transfer pin 20 is spaced to address a unique well 12 in the platen 10. In FIG. 2, multiple transfer pins 20 are held in an array by an electrical insulating plate 32. The bottoms of the transfer pins 20 may be slotted as shown in FIG. 2, or have some other geometry for holding liquid samples for dispensing. In addition, the bottoms of the transfer pins 20 may be squared off as shown in FIG. 2, or may be tapered as in FIG. 1, or have some other shape geometry.

The top side of each of the transfer pins 20 may be electrically connected either directly or via a resistor, switch, or transistor to a voltage source. The voltage may be specific for each transfer pin 20, or multiple transfer pins 20 may share a common voltage source.

The top sides of the transfer pins 20 are electrically connected to pin voltage sources 36 in a voltage control array 34, which may optionally include a voltage control port 38 addressable by an external processor. Each individual pin voltage source 36 may be, for example, a resistor element in a resistor network (i.e., the voltage control array 34) connected to a high voltage source so that each transfer pin 20 is connected via its own resistor to the high voltage source. To reduce the cost and size of the system, a single source resistor may be placed between the high voltage source and the resistor network, which allows the use of smaller, cheaper lower resistance resistors in the network together with a single bulky, more expensive, high-resistance resistor at the source. For example, the source resistor could be a 1 to 10 gigaohm resistor, and the pin resistors could be 1 to 10 megohms each. However, it may be advantageous in terms of uniformity of transfer throughout the pin array 30 to have a higher resistance on the pin resistors, for example each pin having a gigohm resistor.

To individually actuate at least one transfer pin 20 using voltage application, a controllable switch may be placed in series with each actuable pin. These switches may be, for example, high voltage transistors or relays, and also may be controlled by a microprocessor. In one specific embodiment, each spring-loaded transfer pin 20 may be loaded on a spring, which also acts as an electrical contact to a printed circuit board voltage control array 34. The printed circuit board voltage control array 34 may contain the resistor network and connections to the high voltage source. In some embodiments, the printed circuit board voltage control array 34 also may contain the switch networks and connections to the computer or other device for selecting a sample dispensing pattern.

Thus, in one embodiment, each transfer pin 20 in a multiple pin array 30 is individually addressable for purposes of applying a high voltage potential to the pin. In such a pin array 30, one transfer pin 20 at a time may be actuable, multiple pins may be actuable at one time, or all of the pins in the array may be actuable at one time. The more transfer pins 20 that are actuated at any one time, the greater the parallel processing of the system. By actuating different patterns of multiple transfer pins 20 (in a manner analogous to an ink jet computer printer) patterns of samples may be developed. By repeating this process, layered patterns may be developed, including the synthesis of organic molecules such as peptides, small molecules or oligonucleotides.

In another embodiment, a pin array may be equipped with a controller for selectively extending or retracting a subset of transfer pins 20 to cause contact or removal from contact of those pins for the purpose of dispensing a pattern of sample. For example, an array of solenoids could be used to retract those transfer pins 20 that are not desired to contact the receptacle well 12. The solenoids may act directly on the transfer pin 20, or by a remote drive mechanism such as an array of pistons positioned slidably in an array of tubes. Alternatively, an array of controllable valves connected to a vacuum or pressure manifold may be used to selectively retract or extend a subset of transfer pins 20. Moving the pins in the array 30 so that only transfer pins 20 selected for sample transfer approach the opening of selected wells 12 avoids inadvertent transfer of a liquid samples from non-selected pins to non-selected wells, such as by wetting, which may occur even when no voltage is applied to a non-selected pin. It may be desirable to both selectively actuate a pattern of transfer pins 20 using both movement controllers and application of high voltage to the selected pins in order to prevent inadvertent dispensing, such as by electrospray.

Although various exemplary embodiments of the invention have been disclosed, it should be apparent to those skilled in the art that various changes and modifications can be made which will achieve some of the advantages of the invention without departing from the true scope of the invention.

What is claimed is:

1. A microfluidic liquid dispenser system, comprising:
    a target receptacle comprising an opening and a corresponding through-hole through a platen, the through-hole characterized by a hole diameter and hole volume; and
    a dispenser comprising:
        at least one transfer pin adapted for transferring a microfluidic sample of liquid to a target receptacle; and
        a pin tip at one end of the transfer pin, the pin tip comprising a tapered shape and a slot, the tapered shape comprising a smaller diameter that is less than the hole diameter and a larger diameter that is greater than the hole diameter;
        wherein the tapered end is configured to hold an amount of liquid that is sufficient to fill a multiple number of the through-hole in succession without replenishment.

2. A liquid dispenser system according to claim 1, wherein the through-hole extends from a first opening on one planar surface of the platen array to a second opening on an opposing surface of the platen array.

3. A liquid dispenser system according to claim 2, wherein the second opening is not bonded to a substrate.

4. A liquid dispenser system according to claim 1, wherein the opening includes hydrophilic wall, the openings being surrounded by hydrophobic material.

5. A liquid dispenser system according to claim 1, further comprising:
    a transfer pin array including a plurality of transfer pins adapted for transferring a plurality of samples to a corresponding plurality of target receptacles.

6. A liquid dispenser system according to claim 5, wherein the target receptacle comprises a plurality of openings and a corresponding plurality of through-holes through the plate, the transfer pin array is characterized by a spacing between a adjacent transfer pins in a predetermined direction, and the plurality of openings is characterized by a spacing between adjacent opening in the predetermined direction that is less than the spacing between a adjacent transfer pins.

7. A liquid dispenser system according to claim 1, wherein the the tapered shape is characterized by a proximal portion having a diameter greater than a diameter of the opening and distal portion having a diameter less than the diameter of the opening.

8. A liquid dispenser system according to claim 1, wherein the pin tip has one or more structural features that increase the surface area of a sample at the pin tip.

9. A liquid dispenser system according to claim 1, wherein the at least one transfer pin is adapted to dispense multiple samples without replenishment.

10. A liquid dispenser system according to claim 1, further comprising:
    a positioning module configured to place the transfer pin in direct contact with the target receptacle.

11. A liquid dispenser system according to claim 10, wherein the positioning module is configured to accelerate and decelerate the transfer pin.

12. A liquid dispenser system according to claim 1, wherein the pin tip comprises a tapered slot.

13. A liquid dispenser system according to claim 12, wherein the tapered shape of the pin tip is characterized by a first taper angle and the tapered slot is characterized by a second taper angle that is less than the first taper angle.

14. A liquid dispenser system according to claim 1, wherein the opening is characterized by an outer periphery and the dispenser comprises a configuration in which a transfer pin of the at least one transfer pin contacts the opening along the outer periphery.

15. A method for use in dispensing a microfluidic sample of a liquid, the method comprising:
    providing a microfluidic sample of at least one liquid to at least one transfer pin adapted for transferring the sample to a target receptacle, one end of the at least one transfer pin having a pin tip comprising a tapered shape and a slot, the tapered shape comprising a smaller diameter and a larger diameter;

using capillary action between the pin tip and the target receptacle to transfer the sample from the at least one transfer pin to the target receptacle, wherein the target receptacle comprises a plurality of through-holes in a platen, each through-hole characterized by a hole diameter and hole volume, the smaller diameter being less than the hole diameter and the larger diameter being greater than the hole diameter; and filling a plurality of the through-holes in succession without replenishing the pin tip with the at least one liquid.

16. A method according to claim 15, wherein each of plurality of through-holes extends from a first opening on one planar surface of the platen array to a second opening on an opposing surface of the platen array.

17. A method according to claim 16, wherein each of the second opening is not bonded to a substrate.

18. A method according to claim 16, wherein the first opening is characterized by an outer periphery, the method further comprising moving one of the at least one transfer pins so as to contact the first opening along outer periphery.

19. A method according to claim 16, further comprising moving a plurality of the transfer pins so as to contact a corresponding through-hole of the plurality of through-holes.

20. A method according to claim 16, further comprising moving a plurality of the transfer pins so as to contact a corresponding through-hole of the plurality of through-holes and to correct for errors in pin placement relative to the placement of the plurality of corresponding through-holes.

21. A method according to claim 15, wherein the target receptacle includes hydrophilic walls that attract the sample.

22. A method according to claim 15, further comprising: providing samples to a transfer pin array including a plurality of transfer pins adapted for transferring a plurality of the samples to a corresponding plurality of target receptacles.

23. A method according to claim 15, wherein the transfer pin has a diameter greater than the opening of the target receptacle.

24. A method according to claim 15, further comprising: applying evaporation control measures to the target receptacle.

25. A method according to claim 15, wherein the at least one transfer pin is adapted to dispense multiple samples without replenishment.

26. A method according to claim 15, wherein the pin tip has a slotted end.

27. A method according to claim 15, wherein the pin tip has one or more structural features that increase the surface area of a sample at the pin tip.

28. A method according to claim 15, further comprising: placing the transfer pin in direct contact with the target receptacle.

29. A method according to claim 28, wherein the step of placing the transfer pin in contact with the target receptacle includes accelerating and decelerating the transfer pin.

30. A microfluidic liquid dispenser system, comprising:
a plurality of transfer pins, each transfer pin configured to transfer a sample of liquid to a target receptacle comprising a platen including a plurality of through-holes having a corresponding plurality of openings, each through-hole characterized by a hole diameter and hole volume;

wherein each transfer pin of the plurality of transfer pins comprises a pin tip comprising a tapered shape and a slot, the tapered shape comprising a smaller diameter that is less than the hole diameter and a larger diameter that is greater than the hole diameter;

wherein each transfer pin is configured to hold an amount of liquid that is sufficient to fill a multiple number of the through-holes in succession without replenishment.

31. A liquid dispenser system according to claim 30, wherein the pin tip comprises a tapered slot.

32. A liquid dispenser system according to claim 31, wherein the tapered shape of the pin tip is characterized by a first taper angle and the tapered slot is characterized by a second taper angle that is less than the first taper angle.

33. A liquid dispenser system according to claim 30, wherein the transfer pin is spring loaded.

34. A liquid dispenser system according to claim 30, wherein each of the corresponding openings is characterized by an outer periphery and the dispenser comprises a configuration in which the transfer pins are configured to contact their corresponding opening along the outer periphery.

* * * * *